US011095444B2

(12) United States Patent
Falk

(10) Patent No.: US 11,095,444 B2
(45) Date of Patent: Aug. 17, 2021

(54) METHOD AND COMPUTER FOR CRYPTOGRAPHICALLY PROTECTING CONTROL COMMUNICATION IN AND/OR SERVICE ACCESS TO IT SYSTEMS, IN PARTICULAR IN CONNECTION WITH THE DIAGNOSIS AND CONFIGURATION IN AN AUTOMATION, CONTROL OR SUPERVISORY SYSTEM

(71) Applicant: Siemens Aktiengesellschaft, Munich (DE)

(72) Inventor: Rainer Falk, Poing (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/483,915

(22) PCT Filed: Jan. 11, 2018

(86) PCT No.: PCT/EP2018/050609
§ 371 (c)(1),
(2) Date: Aug. 6, 2019

(87) PCT Pub. No.: WO2018/145847
PCT Pub. Date: Aug. 16, 2018

(65) Prior Publication Data
US 2019/0394027 A1 Dec. 26, 2019

(30) Foreign Application Priority Data
Feb. 8, 2017 (DE) ...................... 10 2017 202 002.4

(51) Int. Cl.
*H04K 1/00* (2006.01)
*H04L 9/08* (2006.01)
(Continued)

(52) U.S. Cl.
CPC ............ *H04L 9/088* (2013.01); *H04L 9/0637* (2013.01); *H04L 63/0428* (2013.01); *H04L 2209/38* (2013.01)

(58) Field of Classification Search
CPC ... H04L 9/00; H04L 9/088; H04L 9/14; H04L 63/0428; H04L 9/0637; H04L 2209/38;
(Continued)

(56) References Cited

U.S. PATENT DOCUMENTS 6,202,157 B1    3/2001 Brownlie et al.
7,219,223 B1 *  5/2007 Bacchus ............ H04L 63/0428
                                                 713/150
(Continued)

FOREIGN PATENT DOCUMENTS

CN    103731432 A    4/2014
CN    104025505 A    9/2014
(Continued)

OTHER PUBLICATIONS https://en.bitcoin.it/wiki/Proof_of_work; retrieved Feb. 8, 2019.
(Continued)

*Primary Examiner* — Trong H Nguyen
(74) *Attorney, Agent, or Firm* — Schmeiser, Olsen & Watts LLP

(57) ABSTRACT

Automatically and dynamically ascertaining by means of autoconfiguration whether used or activated and usable cipher suites and/or key lengths are sufficiently strong for current cryptographic protection of the control communication and/or other service access by virtue of 1) "cipher-suite"-based/-specific information available in the network/system being called up to ascertain reference cipher suites and/or 2) block chain information available in the network/system, containing data records referred to as "proof of work" for solving complex computation tasks, being called
(Continued)

up or ascertained, with the ascertainment of block chain difficulty parameters as key length estimation parameters to ascertain appropriate reference key lengths, in particular reference minimum key lengths required for cryptoalgorithms, and 3) the ascertained reference cipher suites and/or the reference key lengths ascertained by the key length estimation parameters being compared with the used or activated and usable cipher suites and/or key lengths.

20 Claims, 4 Drawing Sheets

(51) Int. Cl.
*H04L 9/06* (2006.01)
*H04L 29/06* (2006.01)

(58) Field of Classification Search
CPC . H04L 9/3239; H04L 63/12; G06F 2221/034; G06F 21/577; G06F 2221/2107; G06F 21/602; G06F 21/552
See application file for complete search history.

(56) References Cited

U.S. PATENT DOCUMENTS

| | | | |
|---|---|---|---|
| 7,584,508 B1 | 9/2009 | Kashchenko et al. | |
| 7,849,497 B1 | 12/2010 | Hurst et al. | |
| 9,531,705 B1* | 12/2016 | Mehner | H04L 63/0823 |
| 9,973,481 B1* | 5/2018 | Sharifi Mehr | H04L 9/0822 |
| 10,454,689 B1* | 10/2019 | Sharifi Mehr | H04L 63/166 |
| 2004/0117624 A1 | 6/2004 | Hall et al. | |
| 2005/0044418 A1 | 2/2005 | Miliefsky et al. | |
| 2005/0111666 A1* | 5/2005 | Blom | H04L 63/0428 380/277 |
| 2005/0235342 A1* | 10/2005 | Ene-Pietrosanu | G06F 21/602 726/6 |
| 2006/0090198 A1* | 4/2006 | Aaron | H04L 63/105 726/6 |
| 2008/0235801 A1 | 9/2008 | Kachachi et al. | |
| 2012/0117619 A1* | 5/2012 | Jactat | H04W 12/02 726/2 |
| 2012/0131344 A1* | 5/2012 | Bellwood | H04L 9/3247 713/176 |
| 2012/0308007 A1* | 12/2012 | Li | H04W 12/106 380/270 |
| 2013/0104236 A1 | 4/2013 | Ray et al. | |
| 2013/0318576 A1 | 11/2013 | Prakash et al. | |
| 2014/0115702 A1 | 4/2014 | Cooper et al. | |
| 2017/0142162 A1* | 5/2017 | Zhang | H04L 63/205 |
| 2017/0289185 A1* | 10/2017 | Mandyam | H04L 63/1425 |
| 2018/0034807 A1 | 2/2018 | Sugano | |
| 2018/0115521 A1* | 4/2018 | Bansal | H04L 63/08 |

FOREIGN PATENT DOCUMENTS

| | | |
|---|---|---|
| EP | 2998884 A1 | 3/2016 |
| JP | 2013247442 A | 12/2013 |
| JP | 2016500207 A | 1/2016 |
| JP | 2016029787 A | 3/2016 |
| JP | 2016061915 A | 4/2016 |
| WO | WO 0048061 A1 | 8/2000 |

OTHER PUBLICATIONS http://bitcoindifficulty.com; retrieved Feb. 8, 2019.
https://en.bitcoin.it/wiki/Difficulty; retrieved Feb. 8, 2019.
https://www.keylength.com; retrieved Feb. 8, 2019.
PCT International Search Report corresponding to PCT International Application No. PCT/EP2018/050609.
Non-English Chinese Office Action dated Mar. 30, 2020 for Application No. 201880010836.6.
Japanese Office Action for Application No. 2019-542377, dated Jun. 22, 2021.

* cited by examiner

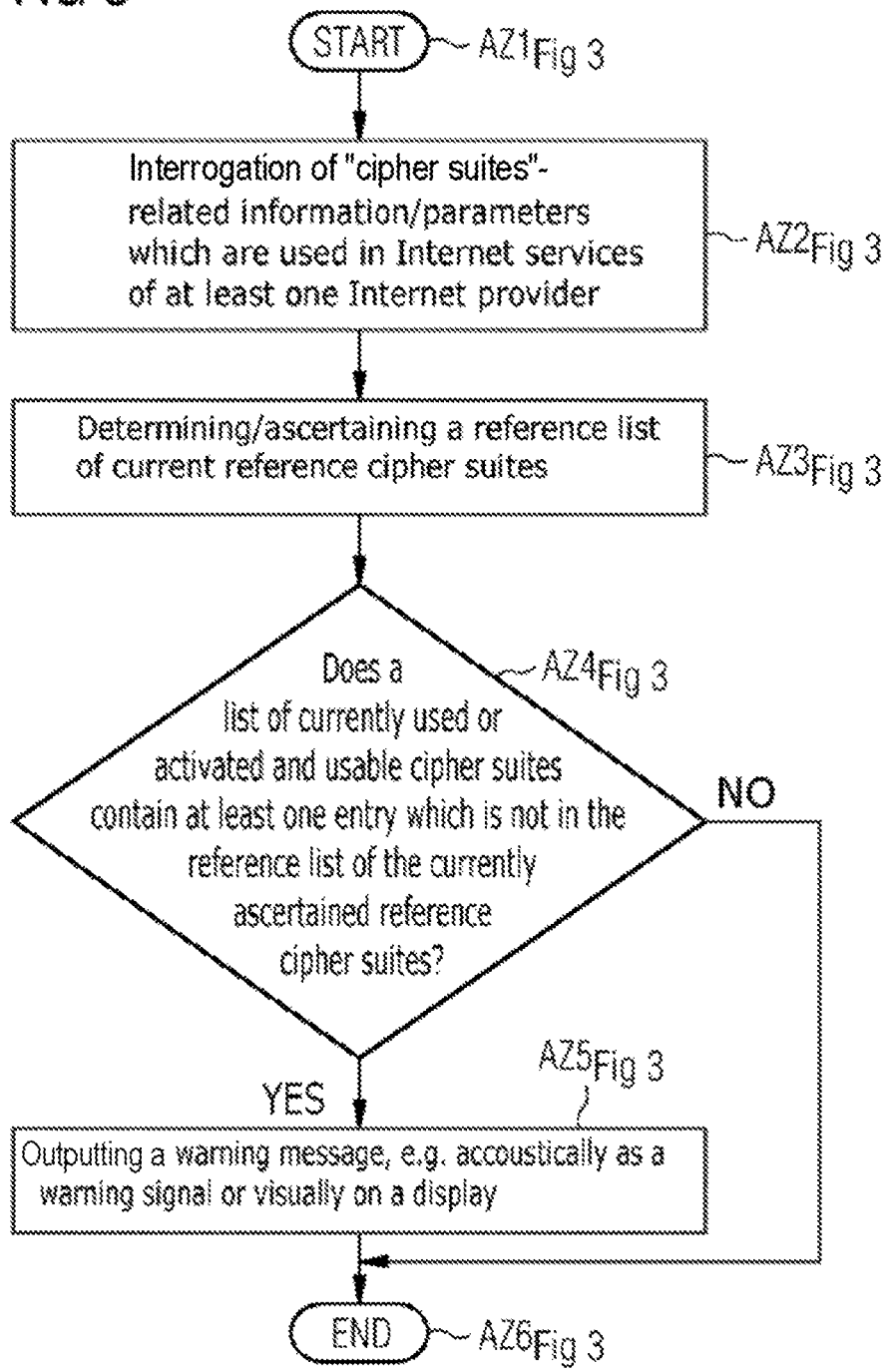

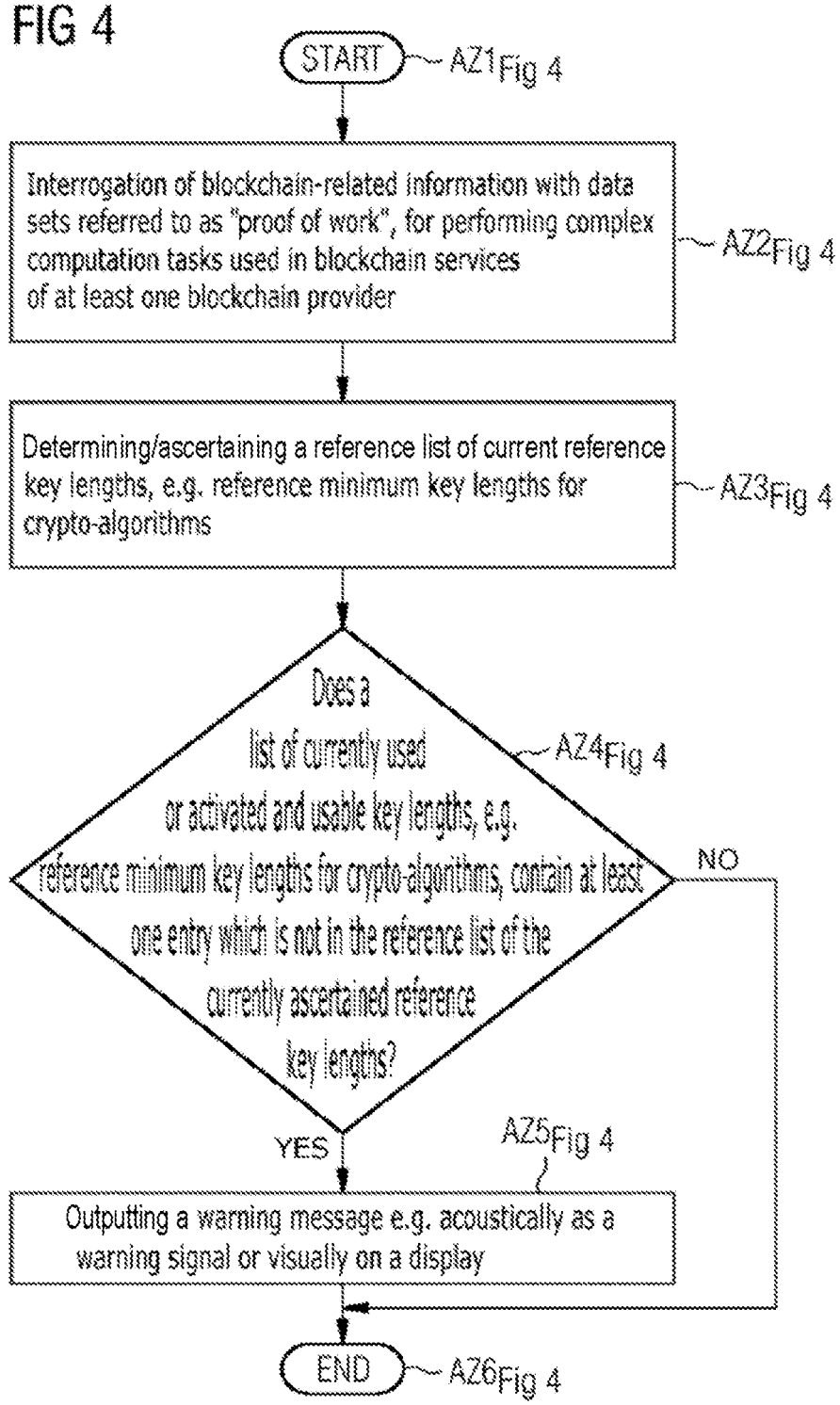

METHOD AND COMPUTER FOR CRYPTOGRAPHICALLY PROTECTING CONTROL COMMUNICATION IN AND/OR SERVICE ACCESS TO IT SYSTEMS, IN PARTICULAR IN CONNECTION WITH THE DIAGNOSIS AND CONFIGURATION IN AN AUTOMATION, CONTROL OR SUPERVISORY SYSTEM

CROSS-REFERENCE TO RELATED APPLICATIONS

This application claims priority to PCT Application No. PCT/EP2018/050609, having a filing date of Jan. 11, 2018, which is based on German Application No. 10 2017 202 002.4, having a filing date of Feb. 8, 2017, the entire contents both of which are hereby incorporated by reference.

FIELD OF TECHNOLOGY

The following relates to a method for cryptographically protecting control communication in and/or service access to IT systems, in particular in connection with the diagnosis and configuration in an automation, control or supervisory system, and to a computer for cryptographically protecting control communication and/or service access to IT systems, in particular in connection with the diagnosis and configuration in an automation, control or supervisory system.

BACKGROUND

Integrated cryptographic protection for components of information technology systems, referred to as IT systems, in particular of industrial data processing systems and control components in automation, control or supervisory systems and corresponding system solutions is required in order to protect against attacks (e.g. tampering, spying, etc.) against the information security of such systems.

An IT system is a system which processes data electronically and which includes, because they are based on VNA (Von Neumann Architecture), e.g. any type of distributed systems and embedded systems, and also systems which process data electronically and are based on Harvard Architecture individual computers, main frame computers, high power computers etc., and to a certain extent also communication systems and the Internet in its entirety.

An essential system-specific functionality is here the cryptographic protection of control communication in IT systems (e.g. "MACsec" according to IEEE specification IEEE 802.1 AE; "IPsec/IKEv2" an "Internet Protocol security"-based protocol stack with which protected communication is to be made possible over potentially insecure networks such as the Internet by using an "Internet Key Exchange" protocol, Version 2 (current version); "TLS" a "Transport Layer Security"-based hybrid encryption protocol for secure data transmission in the Internet) and/or service accesses to IT systems.

In this context, different cryptographic algorithms and types of use are supported in the form of cipher suites and/or key lengths of the crypto-algorithms. There is a need to ensure that sufficiently strong cipher suites and/or certain minimum key lengths are used over the entire period of use of a computer-based device in the system.

There are known recommendations regarding appropriate key lengths by different institutions. For example, key lengths are therefore available at https://www.keylength.com. These recommendations are, however, based only on estimations. The time up to which a cryptographic method with a specific key length is actually secured depends also on unpredicted events, e.g. new methods of attack. The recommendations also cover only a limited time period [e.g. the recommendations of the Federal Office for Information Security [Bundesamt für Sicherheit in der Informationstechnik (BSI)] up to 2021]. For system devices, e.g. with a long period of use of 10 or 20 years such as is the case, for example, in automation systems, such statements are therefore not adequate from today's perspective.

Furthermore, it is known that technical implementations of cryptographic methods (such as "OpenSSL" for the TLS protocol or "StrongSwan" for authentication and key agreement in the case of IPsec) can be configured. As a result, it is possible to limit which cipher suites are supported.

However, specifically in the case of embedded systems, this is frequently defined during the development or commissioning, whereas the recommendations with respect to key lengths can be taken into account manually.

There is therefore the risk that the configuration is not adapted to a changed situation. There is also the risk that a user or administrator activate weak procedures.

Specifically with respect to blockchains, a "proof of work" is known in which nodes for confirming a block of the blockchain have to form a complex computation task. In this context, the complexity of the computation task is adapted to the available computing power; (cf. https://en.bitcoin.it/wiki/Proof of work).

A "Difficulty" parameter is selected in the case of Bitcoin in this context in such a way that approximately every 10 minutes a new block of the blockchain is formed. An overview of the development of the "Difficulty" over time is provided by e.g. https://bitcoindifficulty.com. Further information on Bitcoin difficulty is available at https://bitcoin.it/wiki/Difficulty.

SUMMARY

An aspect relates to a method and computer for cryptographically protecting control communication in and/or service access to IT systems, in particular in connection with the diagnosis and configuration in an automation, control or supervisory system, in which the cryptographic protection of the control communication and/or of the service access is improved.

The concept on which embodiments of the invention is based, according to the technical teaching, consists in the fact that in order to cryptographically protect control communication in and/or service access to IT systems, it is ascertained automatically and dynamically, in particularly regularly or under event control, or manually, in particular on user request, by means of auto-configuration, whether used or activated and usable cipher suites and/or key lengths are sufficiently strong for current cryptographic protection of the control communication and/or of the service access, in that 1) reference cipher suites are ascertained by interrogating "cipher suite"-related/-specific information which is available in the network/system, and/or 2) reference key lengths, in particular reference minimum key lengths which are required, in particular, for crypto-algorithms, are ascertained by interrogating or ascertaining blockchain information which is available in the network/system, with datasets which are referred to as "proof of work", for performing complex computation tasks, with blockchain difficulty parameters being ascertained as key length estimation parameters, and 3) the ascertained reference cipher suites and/or the reference key lengths ascertained by means of the key length estimation parameters are compared with the used or activated and usable cipher suites and/or key lengths.

In this context, it is ascertained, without explicit administration, which key length or cipher suites are currently appropriate. For this purpose, information which is available in the network, e.g. the Internet, the "cipher suite"-related/-specific information and/or the blockchain information is used and evaluated. These are rarely possible to manipulate.

Authenticated, well-known Internet services are used productively. The security of the respective Internet service depends on its configuration. Therefore, it is implausible that these are configured insecurely. Furthermore, increased robustness can be achieved by means of a majority decision using a plurality of Internet services.

The blockchain difficulty or the blockchain difficulty parameter cannot be manipulated downward, since the complexity is adapted in a decentralized fashion as a function of the computing capacity. There is here no single entity which could manipulate this.

This can be done in an advantageous and quite general fashion by means of a computer, wherein this computer can be embodied as a field device, control device, IoT device ("Internet of Things" device), planning tool, servicing tool, testing tool or a diagnosis tool. Depending on the ascertained information it is possible to limit the cipher suites which are supported by the computer (e.g. disable insecure cipher suites).

In another variant, a warning message is output, e.g. as an acoustic warning signal, or the message is displayed visually on a display or as an electric switching signal, e.g. in a service menu or in a log entry, that e.g. cipher suites which are detected as insecure or as no longer up to date are activated in the computer.

In a further variant, cipher suites which can be activated or are activated are characterized as currently appropriate or not appropriate (or characterized at multiple levels, e.g. red, yellow, green). As a result, a user, who is himself no security expert, is provided with information as to which cipher suites are currently still appropriate.

Furthermore, different actions for the use of cipher suites can advantageously be defined for the control communication and/or the service access (for example for the purpose of diagnosis and of configuration). Therefore, e.g. the operative communication when using a cipher suite which is classified as weak can only be logged (warning message). In contrast, in the case of a service access when a cipher suite which is classified as weak is used there may only be a display possibility but no possibility of changing the configuration (the roles or access authorization which can be granted are therefore limited depending on the cipher suite which is used.

The information as to which cipher suites are considered to be appropriate is ascertained or updated automatically during operation. This can be done in different ways (individually or in combination):

A cryptographically protected connection is setup on a trial basis or a connection setup is initiated on a trial basis to known Internet services which are considered to be trustworthy, in order to interrogate cipher suites which are assisted by this Internet service.

A plurality of services can be interrogated. The decision can be formed as an intersection or as a union of the respectively supported cipher suites.

In another variant, a quorum or majority decision of the supported cipher suites is formed. As a result, it is possible to learn from professionally administered Internet services which cipher suites are currently supported by these services.

The estimation of a required minimum key length takes place using a blockchain. Blockchains, such as in particular Bitcoin, implement a "proof of work", in which at least one complex computing task has to be performed. A minimum key length is defined as a function of current blockchain complexity (Bitcoin difficulty), which is a measure of the available computing capacity. For this purpose, the current difficulty is ascertained and determines the respective minimum key length specifically for a crypto-algorithm [such as e.g. advanced encryption standard (AES); RSA cryptosystem (according to Rivest, Shamir, Adleman); digital signature algorithm (DSA); elliptic curve digital signature algorithm (ECDSA), secure hash algorithm 2 (SHA2), Diffie-Hellman key agreement (DH), elliptic curve Diffie-Hellman key agreement (ECDH)].

BRIEF DESCRIPTION

Some of the embodiments will be described in detail, with references to the following Figures, wherein like designations denote like members, wherein.

FIG. 3 shows a first flowchart for testing the cryptographic protection of the control communication and/or of the service access on the basis of cipher suites; and FIG. 4 shows a second flowchart relating to the testing of the cryptographic protection of the control communication and/or of the service access on the basis of key lengths, in particular minimum key lengths which are required for crypto-algorithms.

DETAILED DESCRIPTION

Figure 1:
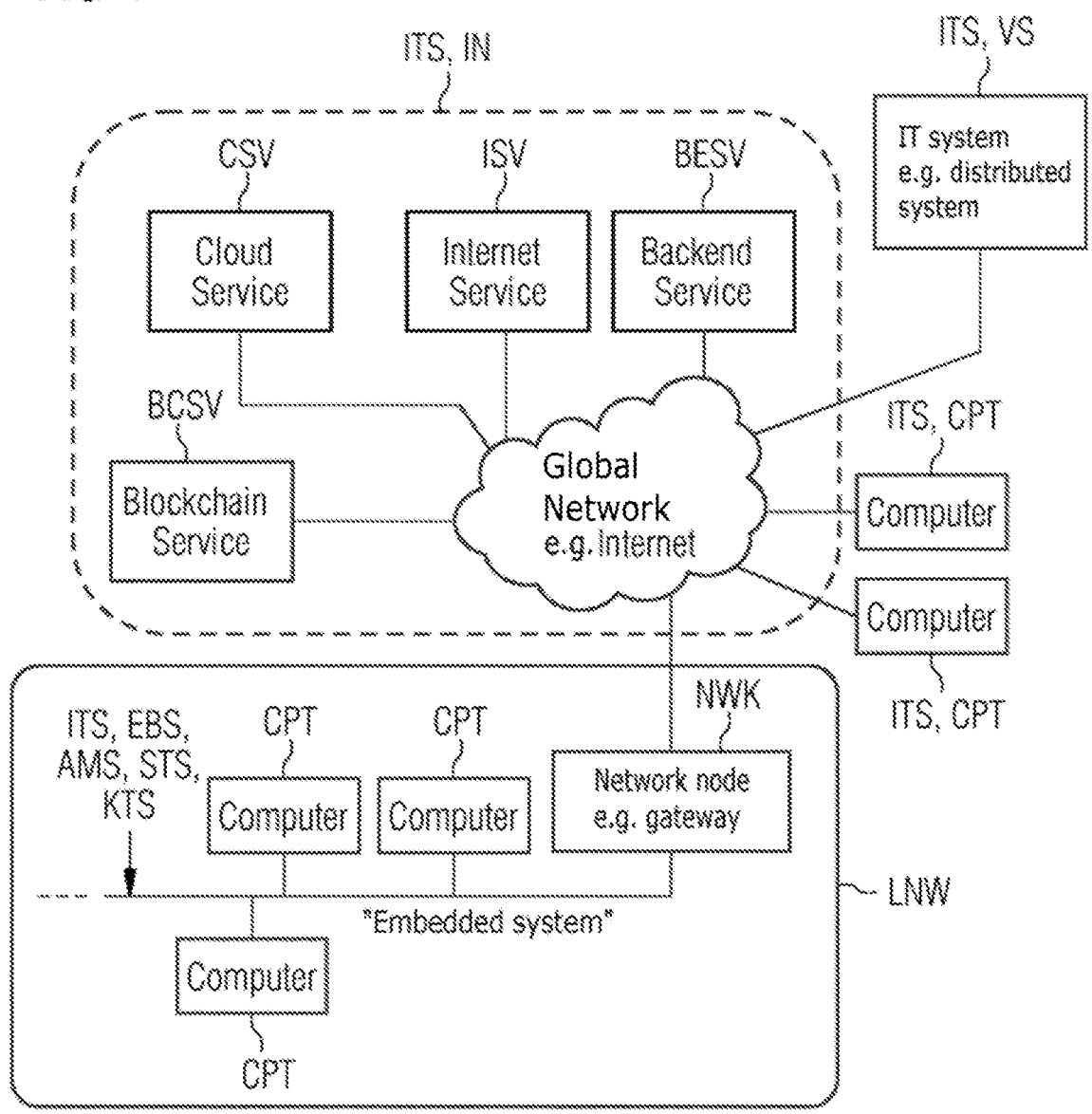
FIG. 1 shows a typical network scenario in the IT environment with a computer-based control communication, e.g. for the purpose of diagnosis and configuration, in an IT system which is embodied e.g. as an automation, control or supervisory system, and/or a computer-based service access to a further IT system.

FIG. 1 shows a typical network scenario in the IT environment with a computer-based control communication, e.g. for the purpose of diagnosis and configuration, in an IT system ITS which is embodied e.g. as an automation system AMS, control system STS or supervisory system KTS, and/or a computer-based service access to a further IT system ITS. According to the definition of an information technology system which is given in the introductory part of the present application, the IT system ITS can quite generally represent a distributed system, an embedded system, an Internet or else also an individual computer. This is also shown by way of example in FIG. 1.

According to this, the automation system AMS, control system STS or supervisory system KTS represents an embedded system EBS which is embodied as a wire-bound or wireless local network LNW, in particular as an Ethernet-based network or WLAN-based network and in which the computer-based control communication takes place.

Furthermore, according to the network scenario a global network GNW, which functions as an Internet and which permits access to diverse systems in an Internet IN which represents the IT system such as, according to FIG. 1, at least one Internet service ISV, at least one Cloud service CSV, at least one backend service BESV and/or at least one blockchain service BCSV, and which makes possible the computer-based control communication within the global network GNW, in other words in a way which is limited in terms of the network used, between an individual computer CPT ("individual computer system") which represents the IT system and a distributed system VS which represents the IT system, as well as across different networks between, firstly, the individual computer CPT and/or the distributed system VS and, secondly, the embedded system EBS which is embodied as a local network LNW.

The distributed system VS and the embedded system EBS are usually "multi-computer systems" (in FIG. 1 this is illustrated as representative of both systems only with respect to the embedded system EBS) in which, as in the case of the "individual computer system" the control communication which is limited to a particular network or across different networks and/or the service access takes place in a computer-based fashion. Therefore, in both systems EBS, VS in each case a computer CPT is decisively involved in each case in respect of control communication across different networks and/or respective service access as in the case of the individual computer system. The control communication across different networks and the service access are carried out here to the superordinate network, according to FIG. 1 to the global network GNW, via a network node NWK, which can be embodied for example as a gateway, in the subordinate network, according to FIG. 1 in the local network LNW.

In contrast, in the case of control communication which is limited to a particular network it is possible for at least two of the computers CPT which are present in the system EBS, VS to be involved.

In the embedded system EBS which is embodied as a "multi-computer system", the computer CPT is configured as a field device, control device, IoT device, planning tool, servicing tool, testing tool or diagnosis tool, in order to control tasks and functions, e.g. the system diagnosis and system configuration, which occur in the automation system AMS, control system STS or supervisory system KTS. Therefore, for example in an automation system AMS with a plurality of field devices and services (e.g. Cloud services, Internet services, backend services etc.), wherein the field device communicates regularly with a backend service, in order e.g. to transmit the status of the device for "predictive maintenance".

This control communication can be protected, e.g. by the "IP-sec/IKEv2" communication protocol or the "TLS" encryption protocol. Furthermore, a plurality of field devices in the automation system AMS can also communicate with one another with protection, e.g. using Ethernet MACsec ("MACsec" according to IEEE specification IEEE 802.1 AE) or WLAN (Wireless Local Area Network according to IEEE 802.11).

In contrast, in the "individual computer system", the computer CPT is an entirely conventional desktop personal computer or a notebook with an access facility into the global network GNW or Internet.

For the system-relevant aspect which is explained in the introductory part of the present application, specifically to provide cryptographically sufficiently secure protection of the computer-based control communication and/or of the computer-based service access, firstly cipher suites and/or key lengths are activated and usable in the computer CPT or else the cipher suites and/or key lengths are already explicitly employed. In this context, in particular the activated and usable or used key lengths have minimum key lengths which are necessary for crypto-algorithms. However, this is frequently too little for sufficiently secure protection because it cannot be ensured that the cipher suites and/or key lengths are sufficiently strong. How the use of sufficiently strong cipher suites and/or key lengths is ensured in the computer CPT (FIG. 2) by means of corresponding measures or by means of a correspondingly methodological procedure (FIGS. 3 and 4) is explained on the basis of the following description in FIGS. 2 to 4.

Figure 2:
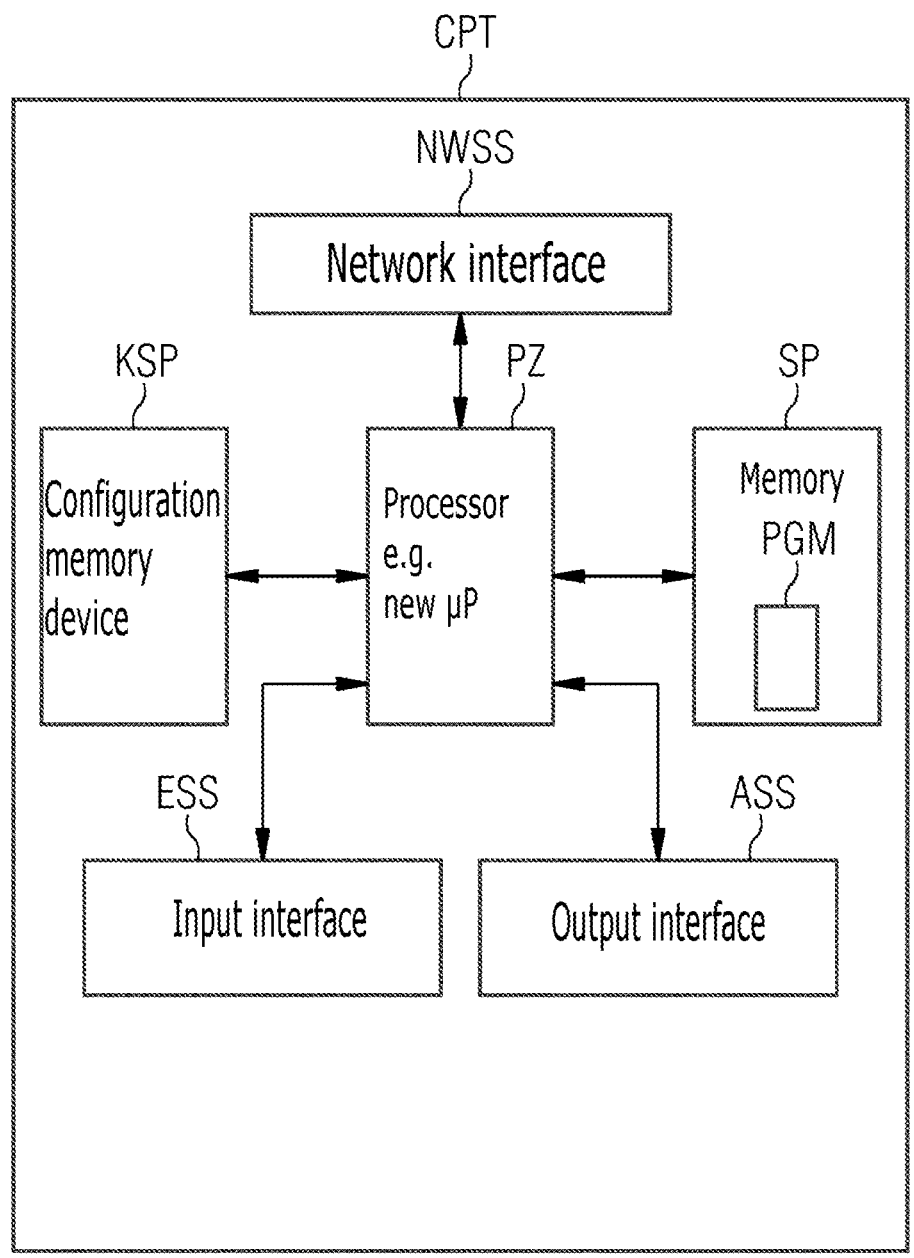
FIG. 2 shows the basic design of a computer which is used for the control communication and/or the service access in the network scenario according to FIG. 1.

FIG. 2 shows the basic structure of a computer CPT which is used for the control communication and/or the service access in the network scenario according to FIG. 1. The computer CPT therefore has a non-volatile, readable memory SP in which process-readable control program commands of a program module PGM which controls the cryptographic protection of the control communication and/or of the service access are stored, a processor PZ which is connected to the memory SP and is embodied as a microprocessor "µP" and which executes the control program commands of the program module PGM, a configuration memory KSP which is connected to the processor PZ and in which the cipher suites and/or key lengths which are activated and usable in the computer CPT or else the cipher suites and/or key lengths which are used thereby, are stored, in a list, a network interface NWSS which is connected to the processor PZ and via which network-related bidirectional data traffic of the computer CPT relating to the computer-based control communication and/or the computer-based service access runs and which forms for this purpose, with the network node NWK, one functional unit, and an input interface ESS and an output interface ASS for user-specific processes in connection with the cryptographic protection of the control communication in and/or of the service access to the IT systems ITS.

The components of the computer CPT which are specified above form one functional unit and are embodied in such a way that it is ascertained either automatically and dynamically or manually, by means of an auto-configuration, whether the used or activated and usable cipher suites and/or key lengths are sufficiently strong for current cryptographic protection of the control communication and/or of the service access.

The automatically and dynamically initiated ascertaining process takes place at regular intervals or can take place at specifically occurring events (event-based control). Irrespective of this, it is advantageous if the ascertaining process takes place in a dedicated operating mode of the computer CPT, e.g. in the weighting mode, in order to avoid adversely affecting other operations or processes which run on the computer.

In the case of the manually initiated ascertaining process, the auto-configuration is started e.g. in response to a request (e.g. inputting of control commands) by the user of the computer CPT via an input interface ESS.

By means of manual configuration, it is also possible to activate, via the input interface ESS, a list of activated cipher suites, limited at least in terms of "cipher suite", or the currently used or activated and usable cipher suite and/or key length.

The determination as to whether the used or activated and useable cipher suites and/or key lengths are sufficiently strong is carried out by virtue of the fact that
1) in the case of an "Internet service (ISV)" access to at least one provider of Internet services, in each case a first communication connection is set up, and/or in the case of a "blockchain service (BCSV)" access to a provider of blockchain services a second communication connection is set up, 2) information which is available on the Internet service of the Internet provider is interrogated, in order to ascertain reference cipher suites which are appropriate for cryptographically protecting the control communication and/or of the service access, and/or 3) available blockchain information relating to the blockchain services of the blockchain provider, with data sets which are referred to as "proof of work" and which have the purpose of performing complex computation tasks, is interrogated or ascertained in order to ascertain reference key lengths which are appropriate for cryptographically protecting the control communication and/or the service access from the blockchain information by ascertaining blockchain difficulty parameters as key length estimation parameters, these reference key lengths being e.g. the reference minimum key lengths which are required for crypto-algorithms, and 4) the ascertained reference cipher suites and/or the reference key lengths which are ascertained by means of the key length estimation parameters are compared with the cipher suites and/or key lengths which are stored, used or activated and usable in the configuration memory KSP.

The information which is interrogated according to points 1) and 2) is e.g. parameter/information with a uniquely defined "cipher suite" reference which is used in Internet services by Internet providers. If information is interrogated from a plurality of Internet service providers in the enquiry, this information can be weighted for the process of ascertaining the appropriate reference cipher suites.

In the case of the blockchain information which is interrogated or ascertained according to point 3), either the block of the blockchain is interrogated directly or a meta service is interrogated via a blockchain, in order to ascertain current blockchain difficulty parameters.

The setting up of the connections does not have to be deliberately or intentionally motivated for the purpose of data transmission, but instead takes place on a trial basis or in the form of a trial. This means that the computer CPT sets up, without actual user data communication, a secure communication connection to Internet services such as e.g. Microsoft®, Amazon®, Google®, IBM®, Siemens®, etc. This communication can be protected e.g. again by means of the "IPsec/IKEv2" communication protocol or the "TLS" encryption protocol.

The interrogating of the information does not necessarily have to take place on the set-up first and second communication connections but rather can also occur on a connection with user data communication.

The storage of the ascertained reference cipher suites and/or reference key lengths can also take place in a list, in a reference list, like the storage of the cipher suites and/or key lengths which are activated and usable in the computer CPT or else of the cipher suites and/or key lengths which are used thereby. In this case, it is appropriate and also expedient for the comparison to be carried out on a list basis.

If the comparison, carried out according to point 4), between a dedicated, currently used or activated and usable cipher suite and/or key length of the cipher suites stored in the configuration memory KSP and/or key lengths and the ascertained reference cipher suites and/or the determined reference key lengths reveals that the currently used or activated and usable cipher suite and/or key length is not among the ascertained reference cipher suites and/or the determined reference key lengths, then a) a warning message which is addressed to the user of the computer CPT is generated and output via the output interface ASS, b) the currently used cipher suite and/or key length is immediately disabled, and/or c) the currently used cipher suite and/or key length is disabled after a grace time of the warning message which is output.

The warning message can be output acoustically, e.g. as a warning signal, or else visually on a display or as an electrical switching signal.

If owing to the comparison which is carried out, the currently used or activated and usable cipher suite and/or key length is disabled, the reference cipher suite and/or reference key length used for the comparison is adopted for use/activation in the computer CPT via the input interface ESS, either automatically after a weighting time or after confirmation by a service technician.

FIG. 3 shows a first flow diagram with a plurality of sequence states $AZ1_{FIG3} \ldots AZ6_{FIG3}$ relating to the testing of the cryptographic protection of the control communication and/or of the service access on the basis of cipher suites. In a first sequence state $AZ1_{FIG3}$ the testing of the cryptographic protection of the control communication and/or of the service access is started.

Then, in a second sequence state $AZ2_{FIG3}$ "cipher suite"-related information/parameters which are used in Internet services of Internet providers are interrogated. In this context, information from a plurality of sources which serve as a reference (Internet services of Internet providers) request, in order to determine an, e.g. plausibility-checked reference list of currently appropriate reference cipher suites therefrom and as a function of the data/information ascertained by request, in a third sequence state $AZ3_{FIG3}$. In this context, e.g. different information sources can be weighted, e.g. inclusion in the reference list if a reference cipher suite is supported by at least 3 sources (Internet services of 3 Internet providers) or if at least 50% of the sources (Internet services of a plurality of Internet providers) support the reference cipher suite.

Furthermore, filtering can be carried out according to a minimum key length, which is ascertained as a function of the difficulty of a blockchain (cf. FIG. 4).

The reference list of current reference cipher suites can additionally apply to the same communication protocol which was used for interrogating the current reference cipher suites e.g. the "Transport Layer Security"-based hybrid encryption protocol used by Google® for secure data transmission in the Internet, in order to ascertain the reference cipher suites employed by Google® when using the TLS protocol.

However, the use preferably occurs for further applications, e.g. reference cipher suites which are ascertained for a different protocol. Therefore, currently permissible reference cipher suites for "MACsec" or "IKEv2/IPsec" are determined as a function of which reference cipher suites are supported by Google® for "TLS" and which difficulty currently applies to a Bitcoin blockchain. Permissible reference cipher suites can also be adapted for further security applications such as file system encryption, message protection in the case of publish/subscribe messaging services, XML security etc.

This reference list of current reference cipher suites is then compared, in a fourth sequence state $AZ4_{FIG3}$, with the list which is stored e.g. in the configuration memory KSP of the computer CPT (cf. FIG. 2) and which has the cipher suites which are used or activated and usable in the computer i.e. the cipher suites which are technically supported on the computer or the cipher suites which are activated by manual configuration. The comparison result entails here the enquiry about the measure: "Does a list of currently used or activated and usable cipher suites contain at least one entry which is not in the reference list of the currently ascertained reference cipher suites?"

If the response to this enquiry is "YES", in a fifth sequence state $AZ5_{FIG3}$ a warning message is output e.g. acoustically as a warning signal or visually on a display or as an electrical switching signal. In another case, if the response to this enquiry is "NO", in a sixth sequence state $AZ6_{FIG3}$, the testing of the cryptographic protection of the control communication and/or of the service access is ended.

In other words, this enquiry clarifies whether a cipher suite is supported which is not contained in the reference list of currently appropriate reference cipher suites. If this is the case, e.g. a warning occurs, in the form of a warning message in the service menu of the computer, as a logging event in the case of detection, and as a logging event in the case of use. In another alternative variant, this cipher suite is automatically disabled, e.g. immediately or after a certain grace time after the outputting of the warning message.

The testing illustrated in FIG. 3 occurs regularly or under event control as does also the ascertaining processes with respect to the cryptographic protection of the control communication and/or the service access which are carried out according to FIG. 2 with the associated figure description. Furthermore, the testing takes place in a specific operating mode of the computer (e.g. in the waiting mode). In addition, the changes can also be adopted automatically, automatically after a weighting time, or after confirmation by a service technician (e.g. confirmation in the configuration settings in a service menu of the computer).

FIG. 4 shows a second sequence diagram with a plurality of sequence states $AZ1_{FIG4}$ . . . $AZ6_{FIG4}$ relating to the testing of the cryptographic protection of the control communication and/or of the service access on the basis of key lengths, in particular minimum key lengths which are required for crypto-algorithms. In a first sequence state $AZ1_{FIG4}$ the testing of the cryptographic protection of the control communication and/or of the service state is started.

Then, in a second sequence state $AZ2_{FIG4}$, blockchain information with data sets which are referred to as "proof of work" and have the purpose of performing complex computation tasks which are used in blockchain services of a blockchain provider is interrogated. In this context, information from a plurality of sources serving as a reference (blockchain services of blockchain providers or blockchain nodes which implement a blockchain) are ascertained by interrogation, in order to determine therefrom, in a fourth sequence stage $AZ3_{FIG4}$, an, e.g. plausibility-checked reference list of currently appropriate reference key lengths, e.g. reference minimum key lengths for crypto-algorithms, as a function of data/information ascertained by interrogation. In this context, e.g. different information sources can be weighted, e.g. inclusion in the reference list if a reference key length, in particular reference minimum key length, of at least three sources (blockchain services of 3 blockchain providers or of blockchain nodes which implement a blockchain) or if at least 50% of the sources (blockchain services of a plurality of blockchain providers or of a multiplicity of blockchain nodes which implement a blockchain) support the reference key length, in particular reference minimum key length. In this context, different blockchains can be tested, e.g. Bitcoin, Ethereum and Hyperledger.

Furthermore, filtering can take place according to a minimum key length which is ascertained as a function of the difficulty of a blockchain.

This reference list of current reference key lengths, in particular reference minimum key lengths, is then compared, in a fourth sequence state $AZ4_{FIG4}$, with the list which is stored e.g. in the configuration memory KSP of the computer CPT (cf. FIG. 2) and has the key lengths, in particular minimum key lengths, which are used or activated and usable in the computer—i.e. the key lengths, in particular minimum key lengths, which are supported technically on the computer, or the key lengths, in particular minimum key lengths which are activated by means of manual configuration. The comparison result entails here interrogation about the measure: "Does a list of currently used or activated and usable key lengths, in particular minimum key lengths, contain at least one entry which is not in the reference list of the currently ascertained reference key lengths, in particular reference minimum key lengths?"

If the response to this interrogation is "YES", in a fifth sequence state $AZ5_{FIG4}$ a warning message is output, e.g. acoustically as a warning signal or visually on a display or as an electrical switching signal. In another case, if the response to this interrogation is "NO", in a sixth sequence state $AZ6_{FIG4}$, the testing of the cryptographic protection of the control communication and/or of the service access is ended.

In other words, this interrogation clarifies whether a key length, in particular minimum key length, is supported which is not contained in the reference list of currently appropriate reference key lengths, in particular reference minimum key lengths. If this is the case, e.g. a warning is issued, for example in the form of a warning message in the service menu of the computer, as a logging event in the case of detection, and as a logging event in the case of use. In another alternative variant, this key length, in particular minimum key length, is disabled automatically, e.g. immediately or after a certain grace time after the outputting of the warning message.

The testing which is illustrated in FIG. 4 takes place again regularly or under the event control (like the testing illustrated in FIG. 3)—as do also the processes of acquiring cryptographic protection of the control communication and/or of the service access which are carried out according to FIG. 2 with the associated figure description. Furthermore, the testing again takes place in a specific operating mode of the computer (e.g. in the waiting mode). In addition, the changes can also be adopted automatically again, automatically after a waiting time, or after confirmation by a service technician (e.g. confirmation in the configuration settings in a service menu of the computer).

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A method for cryptographically protecting control communication in and/or service access to IT systems, in connection with diagnosis and configuration in an automation, control or supervisory system, wherein:

the control communication takes place between a plurality of computers, the service access occurs either across different networks from a local network or directly into a global network to at least one Internet service, to at least one Cloud service, to at least one backend service and/or to at least one blockchain service, and a plurality of different cipher suites and/or key lengths, which are supported by communication protocols for the control communication and/or the service access and are used or activated and usable for cryptographically protecting the control communication and/or the service access in a user computer of the plurality of computers, are stored, the method comprising:

ascertaining, by the user computer, whether the used or activated and usable cipher suites and/or key lengths are appropriate for current cryptographic protection of the control communication and/or of the service access, by setting up, by the user computer, in a course of an "Internet service (ISV)" access by the user computer to at least one trusted provider of the at least one Internet service a first secure communication connection and/or setting up, by the user computer, in a course of a "blockchain service (BCSV)" access by the user computer to at least one trusted provider of blockchain services or to at least one blockchain node, which implements a blockchain, a second secure communication connection, wherein the first secure communication connection and the second secure communication connection are set up on a trial basis that does not include actual user data communication, interrogating, by the user computer and using the first secure communication connection, "cipher suite"-related/-specific information which is available from the at least one trusted provider of the at least one Internet service, in order to ascertain reference cipher suites which are appropriate for cryptographically protecting the control communication and/or the service access, and/or interrogating, using the second secure communication connection, available blockchain information relating to blockchain services of the at least one trusted provider of blockchain services or to the blockchain of the at least one blockchain node, with data sets which are referred to as "proof of work" and have a purpose of performing complex computation tasks, in order to ascertain reference key lengths which are appropriate for cryptographically protecting the control communication and/or the service access from the blockchain information by ascertaining blockchain difficulty parameters as key length estimation parameters, storing, by the user computer, the ascertained reference cipher suites and/or the ascertained reference key lengths which are ascertained by means of the key length estimation parameters, and comparing, by the user computer, the stored ascertained reference cipher suites and/or the stored ascertained reference key lengths which are ascertained by means of the key length estimation parameters with the stored, used or activated and usable cipher suites and/or key lengths.

2. The method as claimed in claim 1, wherein a list, which is limited at least in terms of a "cipher suite", of activated cipher suites or the used or activated and usable cipher suite and/or key length are/is activated by means of manual configuration.

3. The method as claimed in claim 1, wherein when the comparison of a currently used or activated and usable cipher suite and/or key length of the stored cipher suites and/or the stored key lengths with the stored ascertained reference cipher suites and/or the stored ascertained reference key lengths reveals that the currently used or activated and usable cipher suite and/or key length is not among the stored ascertained reference cipher suites and/or the stored ascertained reference key lengths, then (i) a warning message which is addressed to a user of the user computer is generated and output, (ii) the currently used or activated and usable cipher suite and/or key length is immediately disabled, and/or (iii) the currently used or activated and usable cipher suite and/or key length is disabled after a grace time of the warning message which is output.

4. The method as claimed in claim 3, wherein the respective stored ascertained reference cipher suite and/or stored ascertained reference key length which has led to the disabling of the currently used or activated and usable cipher suite and/or key length are/is adopted automatically after a waiting time or after confirmation by a service technician.

5. The method as claimed in claim 1, wherein ascertaining whether the used or activated and usable cipher suites and/or key lengths are appropriate for current cryptographic protection of the control communication and/or of the service access is carried out automatically and dynamically, in particular regularly or under event control.

6. The method of claim 5, wherein ascertaining whether the used or activated and usable cipher suites and/or key lengths are appropriate for current cryptographic protection of the control communication and/or of the service access occurs in a dedicated operating mode of the user computer.

7. The method as claimed in claim 1, wherein the "cipher suite"-related/-specific information which is interrogated for ascertaining the appropriate reference cipher suites is weighted.

8. The method of claim 1, wherein each computer of the plurality of computers is embodied as a field device, control device, IoT device, planning tool, servicing tool, testing tool or diagnosis tool, within a wire-bound or wireless local network, in particular an Ethernet-based or WLAN-based network, or across different networks from a local network to a global network, in particular the Internet.

9. The method of claim 1, wherein the key lengths of the plurality of different cipher suites and/or key lengths comprise reference minimum key lengths which are required for crypto-algorithms.

10. A user computer for cryptographically protecting control communication in and/or service access to IT systems, in connection with diagnosis and configuration in an automation, control or supervisory system, comprising:

a) a network interface and a configuration memory, which are embodied in such a way that a1) the control communication with further computers takes place via the network interface within a wire-bound or wireless local network, a2) the service access occurs via the network interface either across different networks, via a network node, which can be connected to the network interface, of the local network, or directly into a global network to at least one Internet service, to at least one Cloud service, to at least one backend service and/or to at least one blockchain service, a3) a plurality of different cipher suites and/or key lengths, which are supported by communication protocols for the control communication and/or the service access and are used or activated and usable for cryptographically protecting the control communication and/or the service access in the user computer, are stored in the configuration memory, b) wherein a non-volatile, readable memory in which processor-readable control program commands of a program module which controls the cryptographic protection of the control communication and/or of the service access are stored, and a processor which is connected to the non-volatile, readable memory and which executes the control program commands of the program module is connected to the network interface and to the configuration memory, and is designed to control the cryptographic protection of the control communication and/or of the service access to the network interface and to the configuration memory as a functional unit such that b1) it is ascertained whether the used or activated and usable cipher suites and/or key lengths are appropriate for current cryptographic protection of the control communication and/or the service access, by b1.1) setting up, by the user computer, in a course of an "Internet service" access by the user computer to at least one trusted provider of Internet services, in each case a first secure communication connection, and/or setting up by the user computer in a course of a "blockchain service" access to at least one trusted provider of blockchain services or to at least one blockchain, a second secure communication connection, wherein the first secure communication connection and the second secure communication connection are set up on a trial basis that does not include actual user data communication, b1.2) interrogating, by the user computer, using the first secure communication connection, information which is available from the Internet service of the trusted provider of Internet services in order to ascertain reference cipher suites which are appropriate for cryptographically protecting the control communication and/or the service access, and/or interrogating, using the second secure communication connection, available blockchain information relating to the blockchain services of the trusted provider of blockchain services or the at least one blockchain, with data sets which are referred to as "proof of work" and have a purpose of performing complex computation tasks, in order to ascertain reference key lengths which are appropriate for cryptographically protecting the control communication and/or the service access from the blockchain information by ascertaining blockchain difficulty parameters as key length estimation parameters, wherein the ascertained reference cipher suites and/or the ascertained reference key lengths which are ascertained by means of the key length estimation parameters are stored, and b1.3) the stored ascertained reference cipher suites and/or the stored reference key lengths which are ascertained by means of the key length estimation parameters are compared with the used or activated and usable cipher suites and/or key lengths stored in the configuration memory.

11. The user computer as claimed in claim 10, further comprising:

an input interface which is connected to the processor and forms, through the connection between the input interface and the processor, a first functional unit which is configured in such a way that a list of activated cipher suites or the used or activated and usable cipher suite and/or key length are/is activated by means of manual configuration.

12. The user computer as claimed in claim 10, further comprising:

an output interface which is connected to the processor and forms, through the connection between the output interface and the processor together with the program module executed by the processor, and the configuration memory;

a second functional unit which is configured in such a way that when the comparison of a currently used or activated and usable cipher suite and/or key length of the stored cipher suites and/or the stored key lengths with the stored ascertained reference cipher suites and/or the stored ascertained reference key lengths stored in the configuration memory reveals that the currently used or activated and usable cipher suite and/or key length is not among the stored ascertained reference cipher suites and/or the stored ascertained reference key lengths stored in the configuration memory, then (i) a warning message which is addressed to a user of the user computer is generated and output via the output interface, (ii) the currently used or activated and usable cipher suite and/or key length is immediately disabled, and/or (iii) the currently used or activated and usable cipher suite and/or key length is disabled after a grace time of the warning message which is output.

13. The user computer as claimed in claim 12, wherein the processor and the program module are embodied in such a way that the respective stored ascertained reference cipher suite and/or the respective stored ascertained reference key length which has led to the disabling of the currently used or activated and usable cipher suite and/or key length are/is adopted automatically after a waiting time or after confirmation by a service technician via an input interface.

14. The user computer as claimed in claim 10, wherein the processor and the program module are embodied in such a way that ascertaining whether the used or activated and usable cipher suites and/or key lengths are appropriate for current cryptographic protection of the control communication and/or of the service access is carried out automatically and dynamically, in particular regularly or under event control.

15. The user computer as claimed in claim 10, wherein the processor and the program module are embodied in such a way that "cipher suite"-related/-specific information which is interrogated is weighted.

16. A method for cryptographically protecting at least one of control communication and service access for an information technology (IT) system, the method comprising:

ascertaining, by a user computer of the IT system, at least one of:

at least one reference cipher suite, the at least one reference cipher suite being appropriate for cryptographically protecting the at least one of control communication and service access for the IT system, and storing, by the user computer, the ascertained at least one reference cipher suite, wherein the at least one reference cipher suite is ascertained by a first secure connection to at least one first trusted provider set up on a trial basis by the first user computer that does not include actual user data communication; and at least one reference key length, the at least one reference key length being appropriate for cryptographically protecting the at least one of control communication and service access for the IT system, and storing, by the user computer, the ascertained at least one reference key length, wherein the at least one reference key length is ascertained by a second secure connection to at least one second trusted provider set up on a trial basis by the user computer that does not include actual user data communication;

comparing, by the user computer, at least one of:
   the stored ascertained at least one reference cipher suite to at least one current cipher suite, and
   the stored ascertained at least one reference key length to at least one current key length,
   wherein the respective at least one current cipher suite and the at least one current key length are at least one of stored, used, and activated and usable on the user computer; and outputting, by the user computer, an action responsive to determining that the comparing results in a determination that at least one of the at least one current cipher suite and the at least one current key length are not included in the stored ascertained at least one reference cipher suite and the stored ascertained at least one reference key length, respectively, wherein the outputted action is at least one of a warning message and disabling of the respective at least one current cipher suite and at least one current key length.

17. The method of claim 16, wherein at least one of the steps of ascertaining the at least one reference cipher suite and ascertaining the at least one reference key length is carried out automatically and dynamically and occurs in a dedicated operating mode.

18. The method of claim 16, wherein the step of ascertaining the at least one reference cipher suite comprises interrogating cipher suite related information used in internet services of at least one internet provider.

19. The method of claim 16, wherein the step of ascertaining the at least one reference key length comprises interrogating blockchain related information with data sets referred to as proof of work.

20. The method of claim 19, wherein the step of ascertaining the at least one reference key length further comprises using blockchain difficulty parameters as key length estimation parameters.

* * * * *